Dec. 21, 1948.  C. P. LEESE  2,456,790
TRUCK BOLSTER SPRING
Filed March 4, 1944
2 Sheets-Sheet 1
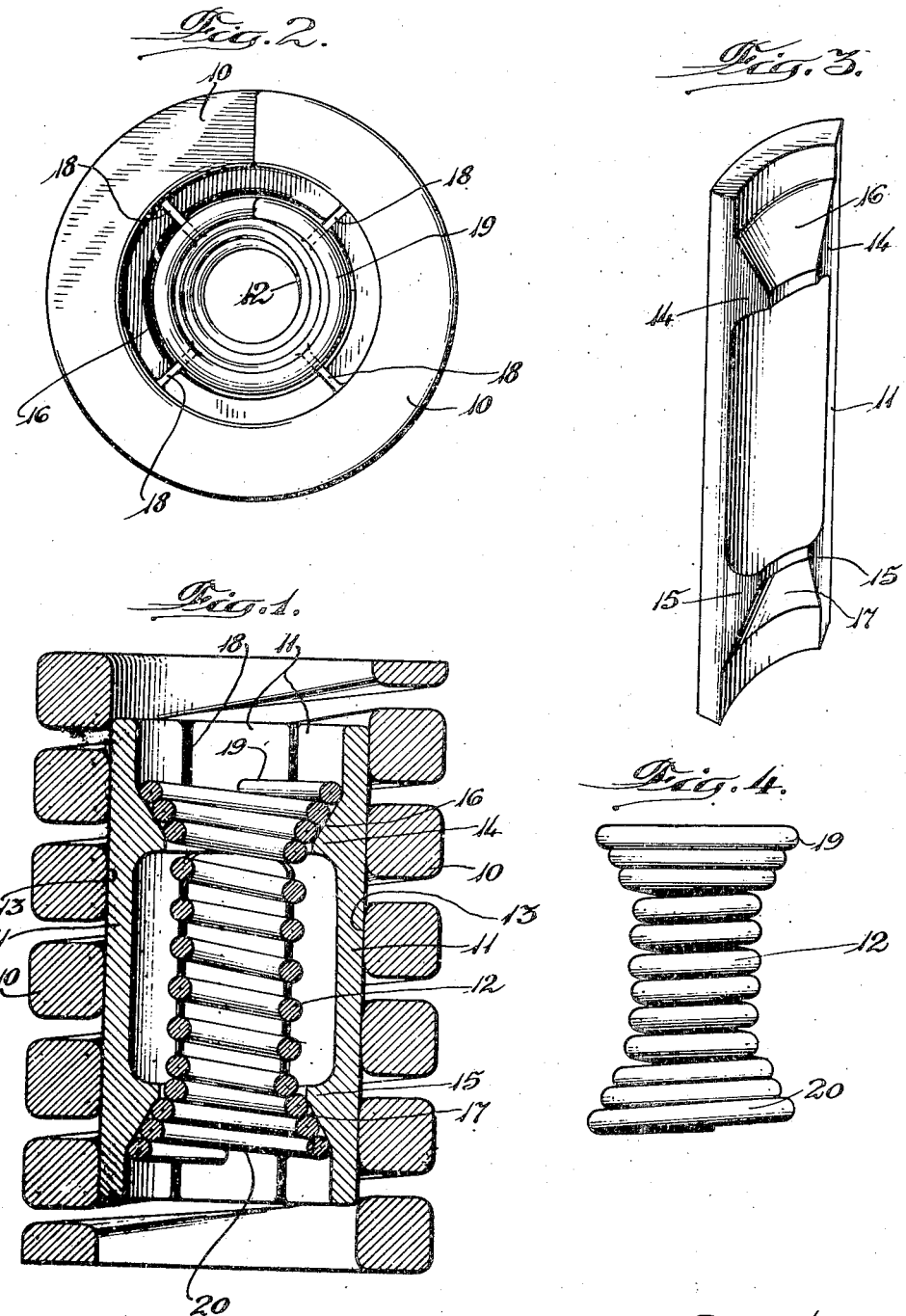

Dec. 21, 1948.　　　　　C. P. LEESE　　　　　2,456,790
TRUCK BOLSTER SPRING
Filed March 4, 1944　　　　　　　　　　2 Sheets-Sheet 2
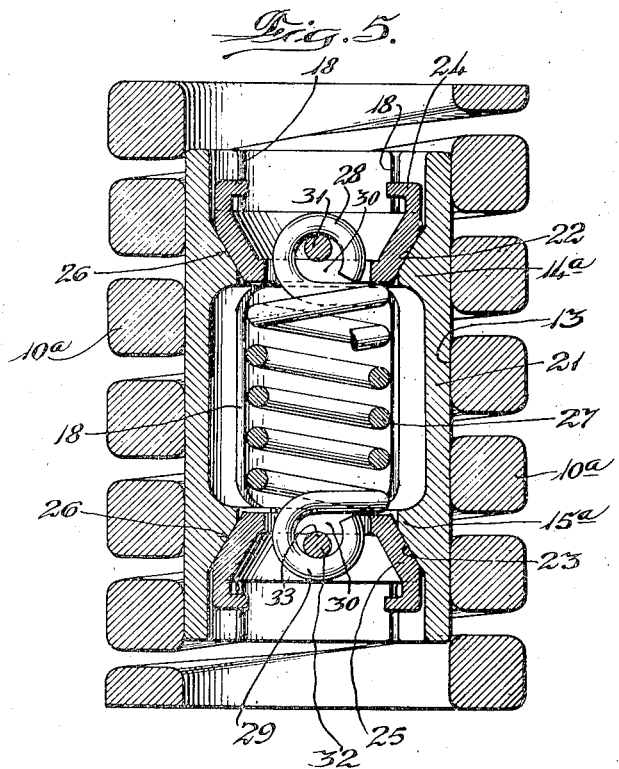
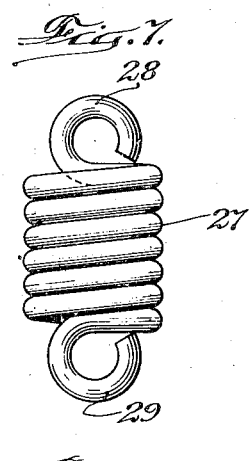
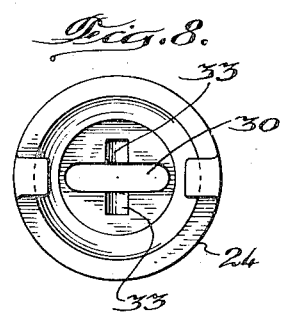
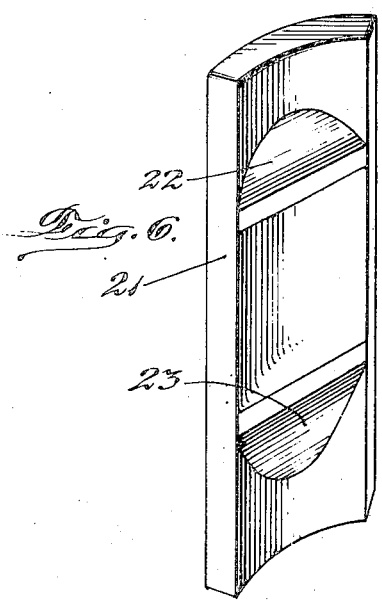
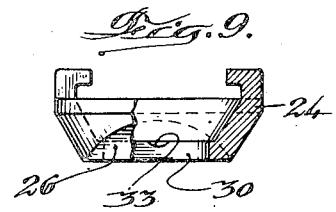
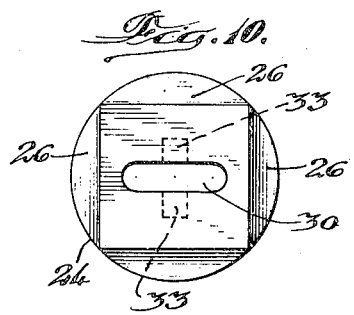
Inventor:
Charles P. Leese
By Barnett & Truman
Attorneys.

Patented Dec. 21, 1948

2,456,790

UNITED STATES PATENT OFFICE 2,456,790

TRUCK BOLSTER SPRING

Charles P. Leese, Chicago, Ill., assignor to Standard Car Truck Company, Chicago, Ill., a corporation of New Jersey Application March 4, 1944, Serial No. 525,021

8 Claims. (Cl. 267—9)

This invention relates to truck bolster springs for railway cars and particularly to spring assemblies including means for damping the spring action so as to avoid excessive vibration thereof.

The principal object of this invention is to provide a friction spring assembly in which shoe elements are forced into frictional engagement with the inner perimeter of the load supporting spring by means of a tension spring formed to coact with wedge faces formed on the shoes.

The invention briefly described includes a load carrying supporting spring made from material of rectangular configuration in cross section, a plurality of friction shoes positioned within the spring so as to bear against the inner perimeter thereof, and a shoe actuating spring engaging the shoes and maintained under tension so that the resilient force exerted by the spring will cause the shoes to press against the said inner perimeter of the load supporting spring.

The invention is illustrated in two specific embodiments in the accompanying drawings, wherein:

Fig. 1 is a vertical section of a friction spring assembly constructed in accordance with this invention.

Fig. 2 is a plan view of the structure shown in Fig. 1.

Fig. 3 illustrates the construction of one of the shoe members shown in Fig. 1.

Fig. 4 is a view in elevation showing the shoe actuating spring before it is installed in the assembly.

Fig. 5 is a vertical sectional view similar to Fig. 1 illustrating a modified construction.

Fig. 6 is a view in perspective of one of the shoe members employed in the modified embodiment.

Fig. 7 illustrates the shoe actuating spring of said modified embodiment; and

Figs. 8, 9 and 10 are detailed views illustrating the construction of the wedge members forming a part of the modified embodiment.

Referring first to the embodiment shown in Figs. 1 to 4, inclusive, of the drawing: 10 designates the load supporting spring, 11 one of the friction shoe members, and 12 a tension spring for holding the shoe members in frictional engagement with the inner perimeter of the load supporting spring.

The load supporting spring 10 is preferably made from stock of rectangular cross section so that the spring when formed will provide flat inner faces 13 of substantial area against which the outer faces of the shoe members 11 will engage. The several friction shoe members 11 are of identical construction and consist in each case of a bar, having curved outer faces corresponding to the curvature of the inner perimeter of the load supporting spring. The inner face of the shoe is provided near the upper and lower ends thereof with inwardly projecting portions 14 and 15, the outer faces of which are inclined to provide wedge forming surfaces 16 and 17. These surfaces are in the form of cone segments so that when the several shoes are arranged in their assembled relation, as illustrated in Figs. 1 and 2, the said wedge forming surfaces provide oppositely arranged truncated cones. The transverse width of the shoes are normally such that when they are arranged within the load supporting spring 10, the edges of adjacent shoes are spaced apart, as indicated in Fig. 2 by the reference character 18, thereby permitting the free radial movement of the shoes.

The shoes are pressed against the inner perimeter of the load supporting spring by means of a shoe actuating tension spring 12, the opposite ends of which are formed with outwardly flared wedge portions 19 and 20 which, when the spring is in its applied position, engage the wedge forming faces 16 and 17 of the shoes, whereby the force exerted by the intermediate portion of the spring 12 tends to draw the outwardly flared wedge portions of the spring against the surfaces 16 and 17 and thereby press the shoes radially outwardly against the inner faces 13 of the spring 10. The outwardly flared end portions of spring 12 include a plurality of the coils of the spring which are preferably formed in close contact with each other so as to provide relatively rigid wedge portions for cooperation with the wedge portions of the shoes.

When assembling the several elements shown in Fig. 1, the spring 12 is stretched to a greater extent than is shown in Fig. 1 and held in this condition by suitable means, not shown. This tensioned condition of the spring permits the shoes to be arranged about the spring 12 in sufficiently close relation to permit the shoes to be inserted into the cylindrical space defined by spring 10. After the shoes are inserted in the said spring, the tensioning device may be removed so as to permit the outwardly flared ends of the spring 12 to fit against the wedge forming surfaces 16 and 17 of the shoes.

The modified embodiment shown in Figs. 5 to 10, inclusive, include a load supporting spring 10ᵃ which corresponds to the load supporting spring of the previous embodiment. The friction shoe members are here designated by the reference numeral 21 and are of the same general construction as the shoes of the previous embodiment except that the inwardly projecting portions 14ª—15ª, instead of being formed with conical wedge forming faces are formed with flat downwardly inclined faces 22 and 23. A pair of wedge members 24—25 are formed with four converging surfaces 26 as shown best in Fig. 10 and adapted to bear against the inclined surfaces 22—23 of the shoes. The wedge members are held in wedging engagement with the surfaces 22—23 by means of a tension spring 27. The spring is preferably of uniform diameter throughout and is provided at opposite ends with eyelets 28—29 which extend through elongated slots 30 formed in the bottom portion of the wedge members. Retaining pins 31—32 extend through the eyelets of the spring and seat in retaining grooves 33 formed in the bottom portion of said wedge members and extend at right angles to the slot 30. The spring 27 is normally formed with its coils closed, as shown in Fig. 7. When the spring is assembled, it is tensioned so as to spread the coils apart as indicated in Fig. 5, whereby the force exerted by the spring tension draws the cup-shaped wedge members into wedging engagement with the inclined faces 22—23 of the shoes.

I claim:

1. A friction bolster spring for a railway car truck comprising a load supporting helical spring, a plurality of friction shoes arranged within the load supporting spring and bearing directly against the inner perimeter thereof; each shoe being provided on its inner face with a pair of wedge-forming faces which converge toward the longitudinal center of the load supporting spring, and a tension spring arranged within the space defined by said shoes and provided at opposite ends with coils of progressively increasing diameter to form integral wedge portions for exerting pressure on said wedge-forming faces to press the shoes outwardly against the load supporting spring.

2. A friction bolster spring for a railway car truck comprising a load supporting helical spring, a plurality of friction shoes, arcuate in cross section, and arranged within the load supporting spring to bear directly against the inner perimeter thereof; each shoe being provided on its inner face with a pair of wedge forming faces which converge toward the longitudinal center of the load supporting spring and are positioned in horizontal alignment with the corresponding wedge forming face of an adjacent shoe, means for forcing the shoes outwardly including outwardly flared wedge portions engaging the wedge-forming faces on said shoes, and a tension spring arranged within the space defined by said shoes and connected to said wedge portions for pressing the shoes outwardly against the load supporting spring.

3. A friction bolster spring for a railway car truck comprising a load supporting helical spring, a plurality of friction shoes, arcuate in cross-section, and arranged with the load supporting spring to bear directly against the inner perimeter thereof; each shoe being provided on its inner face with a pair of wedge-forming faces in the form of cone segments which converge toward the longitudinal center of the load supporting spring, and a tension spring arranged within the space defined by said shoes and provided at opposite ends with coils of progressively increasing diameters to form outwardly flared cone-shaped wedge portions for engaging and exerting pressure on said wedge-forming faces of the shoes to press them outwardly against the load supporting spring.

4. A friction bolster spring for a railway car truck comprising a load supporting helical spring formed from stock of rectangular cross-section so as to provide relatively wide friction surfaces on its inner perimeter, friction shoes arranged within said load supporting spring to bear against said inner surfaces of the spring, each shoe being provided on its inner face with a pair of inclined faces in the form of cone segments which converge toward the longitudinal center of the load supporting spring, a shoe actuating helical spring formed at opposite ends with several of its convolutions arranged in close relation to provide outwardly flared conical wedge portions for engaging the inclined faces on said shoes and the intermediate portion of the wedge actuating spring being normally under tension to exert pressure on the said inclined faces of said shoes.

5. A friction bolster spring for a railway car truck comprising a load supporting helical spring, a plurality of friction shoes arranged within the load supporting spring to bear against the inner perimeter thereof; each shoe being provided on its inner face with a pair of inwardly projecting wedge portions having flat inclined faces which converge toward the longitudinal center of the load supporting spring, wedge follower members arranged to seat against said inclined faces of said shoes, a tension spring connected at opposite ends to said wedge follower members and normally tensioned so as to exert pressure against the shoes to press them outwardly against the inner perimeter of the load supporting spring.

6. A friction bolster spring for a railway car truck comprising a load supporting helical spring, a plurality of friction shoes arranged within the load supporting spring to bear against the inner perimeter thereof; each shoe being provided on its inner face with a pair of inwardly projecting wedge portions having flat inclined faces which converge toward the longitudinal center of the load supporting spring, wedge follower members of cup-shaped configuration having slots formed in their bottom sides and arranged to seat against the wedge-forming faces of said shoes, and a tension spring formed with eyelets extending through the said slots of the wedge followers, pins extending through said eyelets to connect said tension spring with the said follower members whereby the force exerted by said spring is transmitted through the said wedge followers to the shoes so as to force the shoes outwardly against the load supporting spring.

7. A friction bolster spring for a railway car truck comprising a load supporting helical spring and means for damping the vibratory movements of the spring comprising a plurality of shoe members arranged within the spring to bear against the inner perimeter thereof; each shoe being formed adjacent its upper and lower ends with inwardly projecting portions having flat inclined faces to provide wedge surfaces, a pair of cup-members each formed with wedge-forming faces corresponding in number to the said shoes employed and seating on the wedge-forming faces of said shoes, and a tension spring interposed between and connecting said wedge members whereby the force exerted by the spring is transmitted through the wedge members to the shoes to force them outwardly against the load supporting spring.

8. A friction bolster spring for a railway car truck comprising a load supporting helical spring and means for damping the vibratory movements of the spring comprising a plurality of shoe members arranged within the spring to bear against the inner perimeter thereof; each shoe being formed adjacent its upper and lower ends with inwardly projecting portions having flat inclined faces to provide wedge surfaces which converge toward the center of the load supporting spring, a pair of cup-members each formed with wedge-forming faces corresponding in number to the said shoes employed and seating on the wedge-forming faces of said shoes, and a tension spring interposed between and connecting said wedge members whereby the force exerted by the spring is transmitted through the wedge members to the shoes to force them outwardly against the load supporting spring, and the said cup-shaped wedge members being formed with lugs for engagement with a tensioning device during the assembly of the damping means in the load supporting spring.

CHARLES P. LEESE.

REFERENCES CITED

The following references are of record in the file of this patent:

UNITED STATES PATENTS

| Number | Name | Date |
| --- | --- | --- |
| 1,127,657 | McCormick | Feb. 9, 1915 |
| 1,168,448 | Westinghouse | Jan. 18, 1916 |
| 1,757,437 | Muldoon | May 6, 1930 |
| 2,097,523 | Hedgcock et al. | Nov. 2, 1937 |
| 2,182,917 | Dentler | Dec. 12, 1939 |
| 2,219,001 | Woodman | Oct. 22, 1940 |
| 2,254,781 | Rabbitt | Sept. 2, 1941 |